United States Patent [19]

Petelka

[11] Patent Number: 6,062,780
[45] Date of Patent: May 16, 2000

[54] ADJUSTABLE DECKING SYSTEM

[76] Inventor: Brian W. Petelka, 10 Tansley Tr., Carlisle, Ontario, Canada, L0R 2H0

[21] Appl. No.: 09/057,559

[22] Filed: Apr. 9, 1998

[51] Int. Cl.$^7$ ...................................................... B60P 7/08
[52] U.S. Cl. ............................ 410/89; 410/143; 410/145; 410/146; 410/150
[58] Field of Search ............................... 410/89, 26, 143, 410/144, 145, 146, 148, 150; 211/105.3; 248/354.1; 105/370

[56] References Cited

U.S. PATENT DOCUMENTS

| | | |
|---|---|---|
| 3,534,692 | 10/1970 | Val Verde . |
| 4,067,263 | 1/1978 | Naffa et al. ............................... 410/144 |
| 4,079,677 | 3/1978 | Vandergriff et al. . |
| 4,091,745 | 5/1978 | Patch . |
| 4,464,089 | 8/1984 | Allen ................................... 410/143 X |
| 4,494,896 | 1/1985 | DiFranco ................................. 410/148 |
| 4,553,888 | 11/1985 | Crissy et al. ............................. 410/144 |
| 4,759,668 | 7/1988 | Larsen et al. .............................. 410/26 |
| 5,338,137 | 8/1994 | Jensen ..................................... 410/146 |
| 5,785,475 | 7/1998 | Winstel et al. ........................... 410/146 |
| 5,807,047 | 9/1998 | Cox ..................................... 410/143 X |

FOREIGN PATENT DOCUMENTS

| | | |
|---|---|---|
| 464167 | 4/1950 | Canada . |
| 683264 | 3/1964 | Canada . |
| 2266706 | 11/1993 | United Kingdom ................... 410/145 |

*Primary Examiner*—Stephen T. Gordon
*Attorney, Agent, or Firm*—Sixbey, Friedman, Leedom & Ferguson, P.C.; Jeffrey L. Costellia

[57] ABSTRACT

In accordance with the present invention, there is provided an improved adjustable and vertically lockable decking system for use in supporting freight in a cargo vessel wherein the vessel has opposing side walls. The system includes at least one pair of elongated strips, each of the pair adapted to be mounted vertically on each of the opposing walls. Each of the strips comprises a plurality of vertically spaced apertures. There is also provided a horizontally oriented support assembly being horizontally adjustable in length so as to span a width of the vessel between the opposing side walls. The assembly is pivotally connected at opposing ends thereof to a latching assembly. The latching assembly comprises a body member, a locking member constructed so as to be moveable between a locked position in which the locking member mateably engages one of the apertures in the strip so as to releasably lock the support assembly in one of a plurality of vertical positions relative to and between the elongated strips and an unlocked position in which the support assembly is moveable to another of the vertical positions, and a biasing member to urge the locking member into the aperture. In use, the locking member may only be released from the locked position by means of force exerted directly upon the locking member.

5 Claims, 5 Drawing Sheets

ADJUSTABLE DECKING SYSTEM

FIELD OF THE INVENTION

This invention relates to an adjustable decking system for use in supporting freight in a cargo vessel.

BACKGROUND OF THE INVENTION

Freight is regularly transported by air, sea, land and rail. In each case, the freight is loaded into a cargo vessel, such as the trailer of a truck or a railway freight car. Unfortunately, due to limitations in the support or decking assemblies within the cargo vessels, the full area of the vessel is not utilized. In particular, the top half or so of the vessel is typically referred to as dead space because it is often left empty due to the impracticalities of loading that dead space with cargo.

Since freight transportation companies are often paid by weight or volume, it is thus highly desirable to find a way to maximize the use of the space within the cargo vessel, in particular, to use the dead space.

Cargo is often supported within the vessel on a decking or shelving system and therefore, it is desirable to have a decking or shelving system which is vertically adjustable to support cargo in the vertical dead spaces and which system can also accommodate various levels of decking or shelving. However, it is crucial that the system be securely locked in any one vertical position yet at the same time be easily manouevred to another vertical position, either to accommodate different load configurations or for stowage when not in use.

While multi-level decking systems are known and currently employed in the freight transportation industry, the applicant is not aware of any systems which maximize the full cargo space of the vessel by allowing use of the vertical dead space, which are easily adjustable in height and width, yet which securely lock the cross members in place to prevent unwanted vertical movement of the cross members. Indeed, the applicant is aware of a current problem in the industry, particularly in the trucking industry, in which decking systems that are vertically positioned at different levels by means of pins mating with apertures in tracks are prone to become dislodged by virtue of the normal motion and jostling of the cargo vessel or by virtue of upwards force exerted on the cross-member.

By way of example of cargo support systems which have been designed in the past but which fail to adequately address the design concerns of the industry, the applicant is aware of the following references: Canadian Patent 464,167 of Evans Products Company, issued Apr. 4, 1950; Canadian Patent 683,264 also of Evans Products Company, issued Mar. 31, 1964; U.S. Pat. No. 3,534,692 of Val Verde, issued Oct. 20, 1970; U.S. Pat. No. 4,079,677, of Vandergriff et al., issued Mar. 21, 1978; and U.S. Pat. No. 4,091,745, of Patch, issued May 30, 1978. The applicant is also aware of U.S. Pat. No. 5,338,137, of Jensen, issued Aug. 16, 1994, which describes an adjustable decking system in which a spring activated latching member is engaged within an opening in a vertically oriented track to secure a beam assembly in place. However, the latching member of the Jensen reference is designed to be easily moved from one vertical position to another. Therefore, the latching member is prone to be easily dislodged from its vertical position by a person exerting an upward force of the beam assembly, or by the simple movement of the cargo vessel, caused for example by the truck passing over potholes or the like in roads, with the result that the cargo will fall from its support.

SUMMARY OF THE INVENTION

It is thus an object of the present invention to provide an adjustable and vertically lockable decking system for use in supporting freight in a cargo vessel.

In one aspect of the invention, there is provided an adjustable and vertically lockable decking system for use in supporting freight in a cargo vessel wherein the vessel has opposing side walls. The system comprises at least one pair of elongated strips, each of the pair adapted to be mounted vertically on each of the opposing walls. Each of the strips comprises a plurality of vertically spaced apertures. There is also provided a horizontally oriented support assembly being horizontally adjustable in length so as to span a width of the vessel between the opposing side walls. The assembly is pivotally connected at opposing ends thereof to a latching assembly. The latching assembly comprises a body member, a locking means constructed so as to be moveable between a locked position in which the locking means mateably engages one of the apertures in the strip so as to releasably lock the support assembly in one of a plurality of vertical positions relative to and between the elongated strips and an unlocked position in which the support assembly is moveable to another of the vertical positions, and biasing means to urge the locking means into the aperture. In use, the locking means may only be released from the locked position by means of force exerted directly upon the locking means.

In another aspect of the invention, the locking means comprises a lever which has a longitudinal member pivotally connected to the body member and a laterally projecting member. The laterally projecting member is designed so as to engage the apertures of the elongated strips in the locked position.

In another aspect of the invention, the locking means further comprises a step in the laterally projecting member constructed so as to lockably engage an upper inside edge of the aperture when the locking means is in the locked position.

BRIEF DESCRIPTION OF THE DRAWINGS

These and other advantages of the invention will become apparent upon reading the following detailed description and upon referring to the drawings in which.

Figure 1:
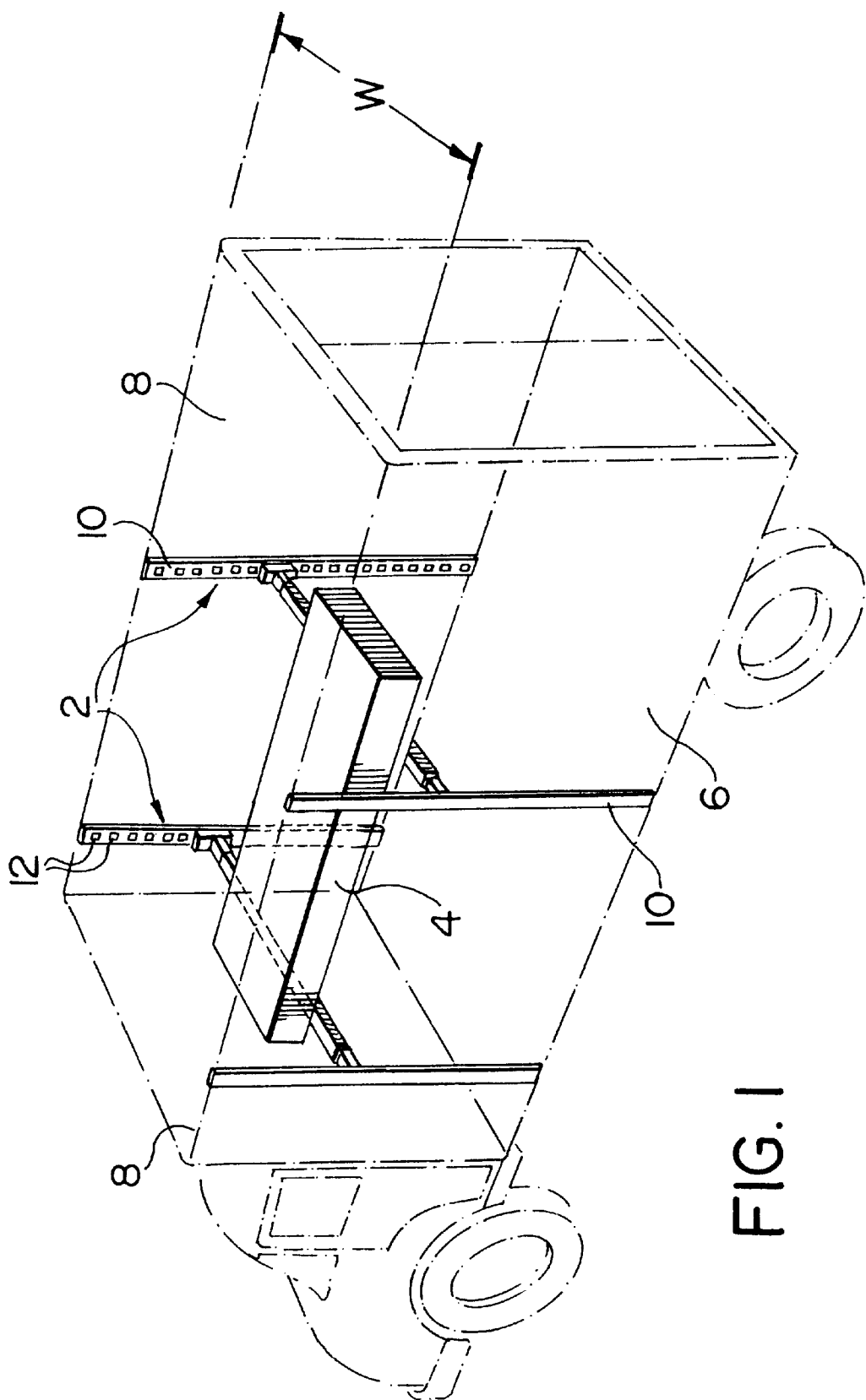
FIG. 1 is a perspective view of the present invention, shown in situ within a cargo vessel.
Figure 2:
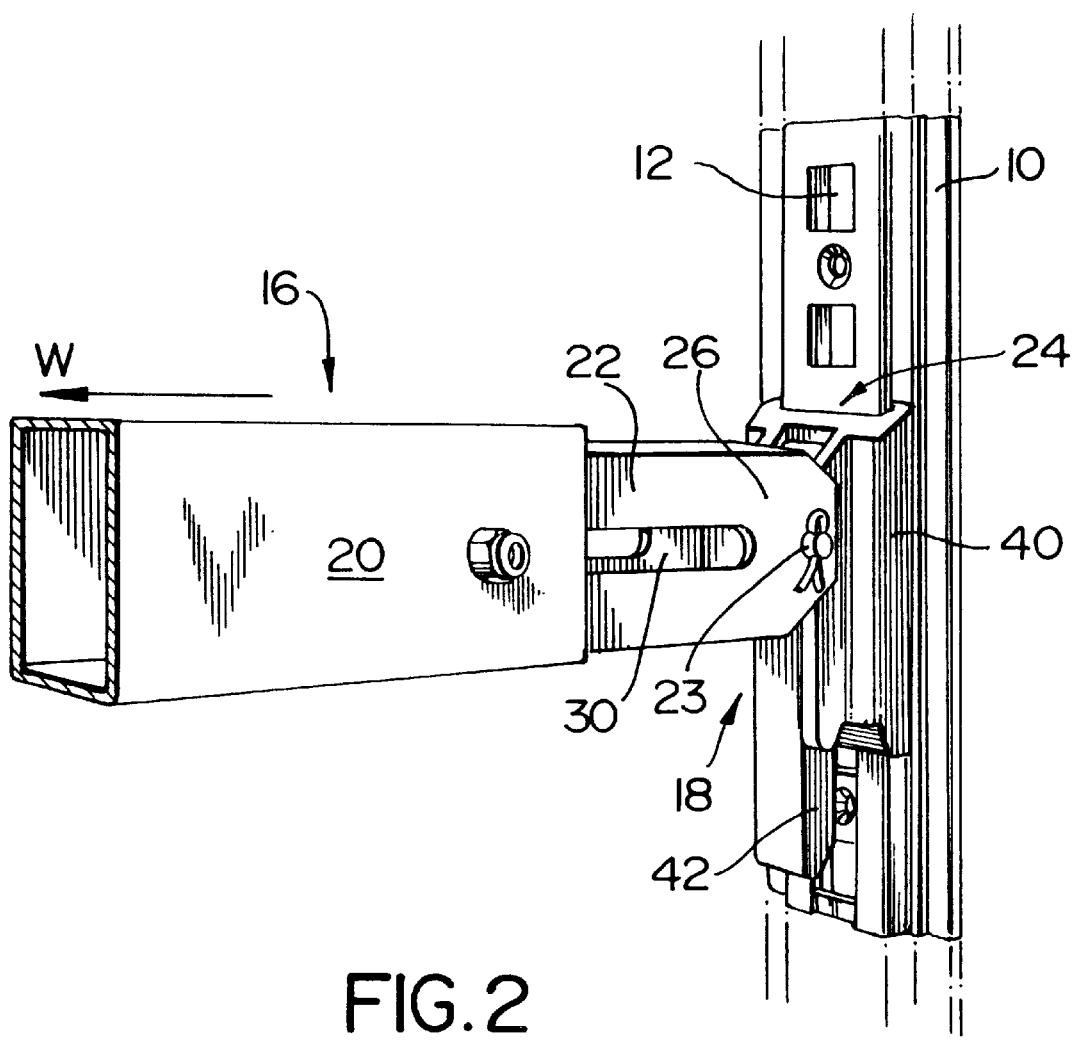
FIG. 2 is a perspective fragmentary view of the system in accordance with a preferred embodiment of the present invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to the drawings, FIG. 1 illustrates an adjustable and vertically self-locking system 2 designed of a heavier construction than those standard in the industry for use in supporting freight 4 in a cargo vessel 6, such as a truck (as illustrated), train car, ship hold or plane cargo area. In any of these cases, the vessel 6 has opposing side walls 8, spaced apart to define a width w.

The system 2 comprises at least one pair of tracks 10 which are elongated strips of aluminum extrusions, or some other suitable material such as steel. As will be apparent to the person skilled in the art, the system 2 can comprise any number of pairs of tracks 10 to suit the cargo vessel 6. For example, a single pair of tracks 10 could be used where the vessel 6 already incorporates a shelf or some similar support means (not shown) as a standard component. Alternatively, two or more pairs of tracks 10 could be used, as shown in FIG. 1. Each of the tracks 10 comprises a series of vertically spaced apertures 12, preferably in the form of square holes, along the length of the track 10.

With reference to FIGS. 2 to 5, the system 2 is further comprised of a horizontal support assembly, shown generally at 16 and a latching assembly, shown generally at 18. The support assembly 16 comprises an exterior hollow tubular beam 20 which is designed to span the width w of the vessel 6 and an interior beam 22 located at either end of the tubular beam 20. The interior beams 22 are each of heavier design than the exterior beam 20 and have a heavier wall thickness to account for the stresses and bending moments exerted upon the ends 24 of the support assembly 16.

The interior beams 22 are each pinned or pivotally connected at 23 to a latching assembly 18 to accommodate the lifting or lowering of the support assembly 16. One end 26 of the interior beam 22 is stationary while the other end has a slot 30 to provide a telescoping movement of the support assembly 16 to account for different widths of vessel 6.

The latching assembly 18 comprises a body member or carriage 40 which is of a heavier design than conventional systems to allow for the unique locking means 42 (to be discussed in greater detail below) and for a greater loading capacity on the support assembly 16. The latching assembly 18 also carries spring 46, which biases the locking means 42 into the locked or engaged position.

Figure 3:
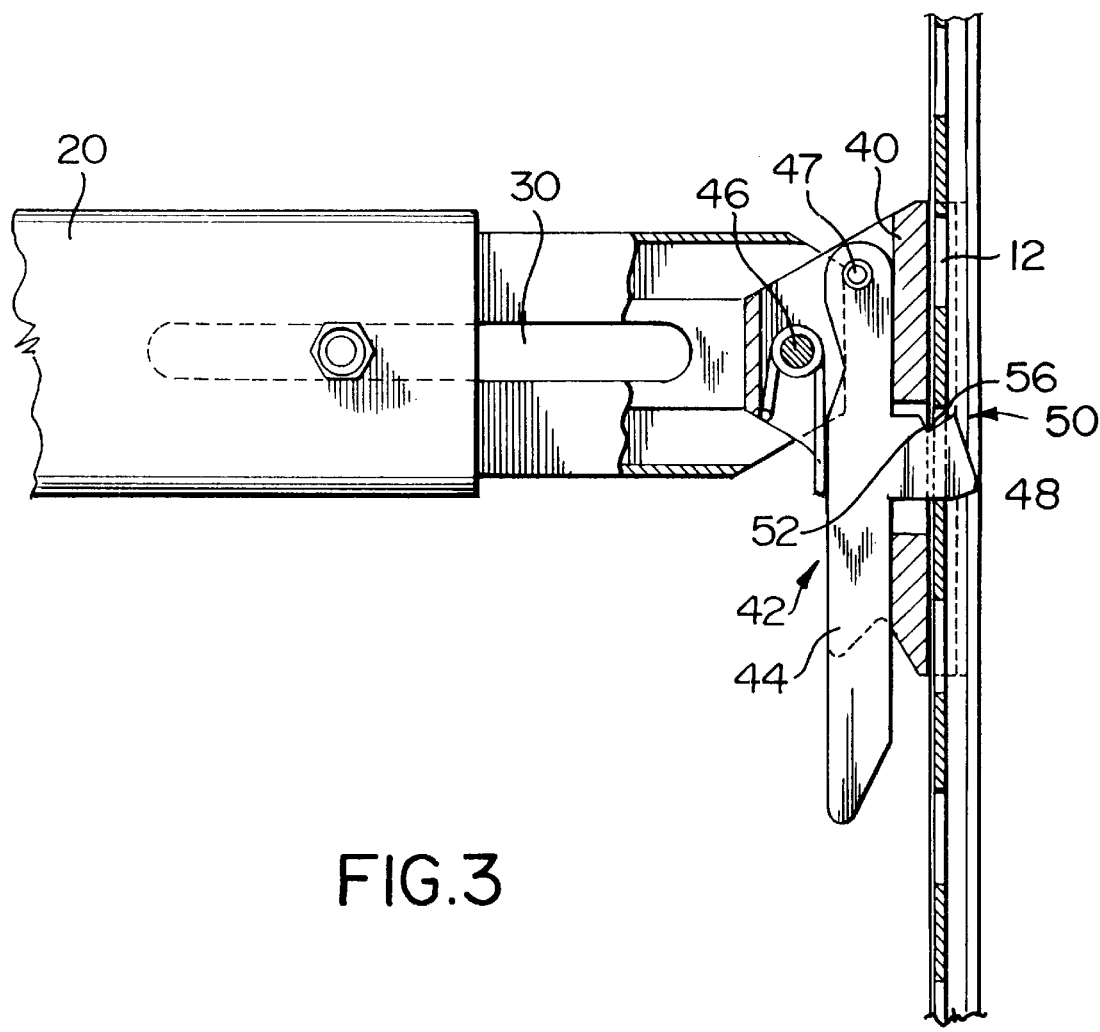
FIG. 3 is a side elevation view, partially in section, of the present invention in the locked position.
Figure 4:
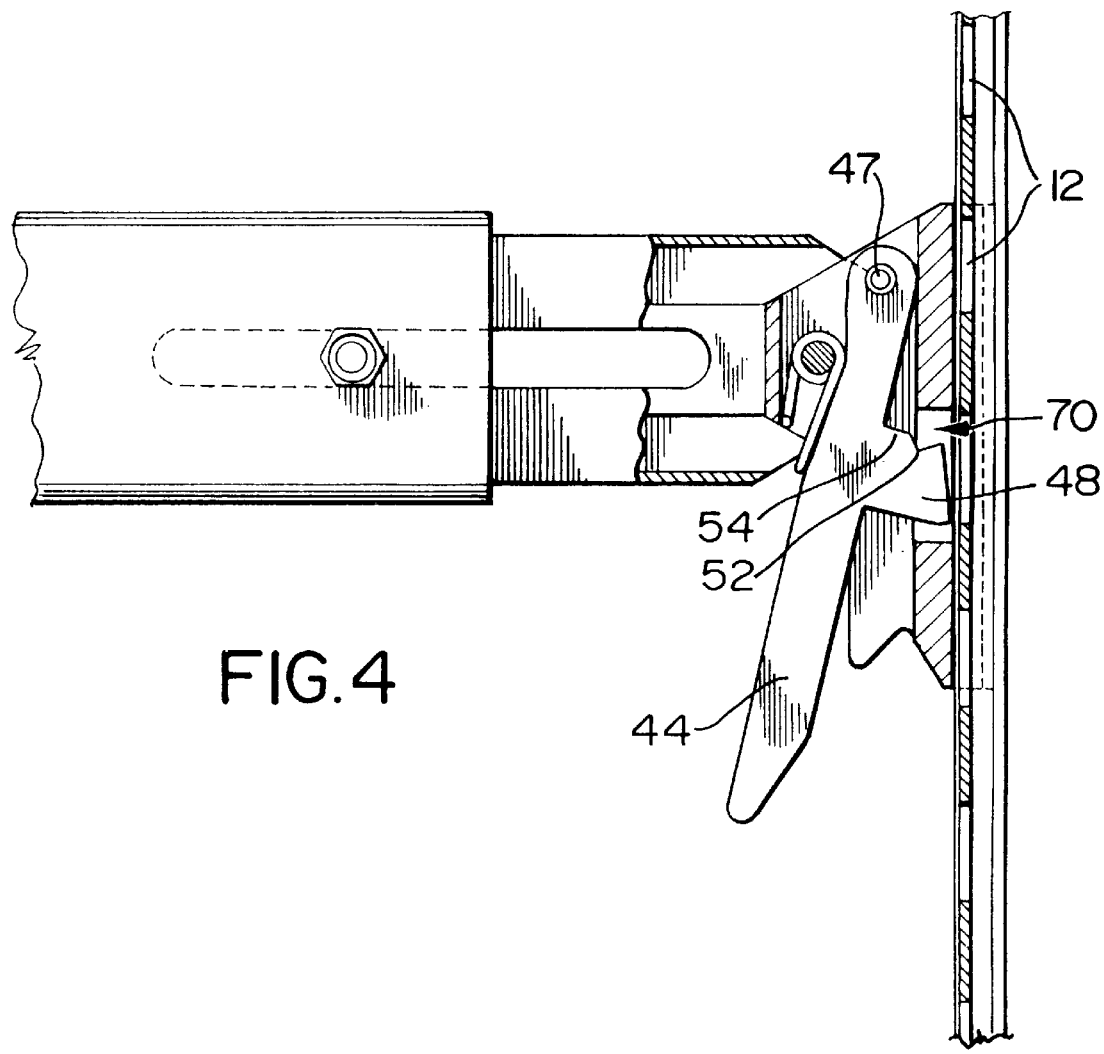
FIG. 4 is a side elevation view, partially in section, of the present invention in the unlocked position.

The locking means 42 comprises a lever 44 pivotally connected to the carriage 40 at 47 and a laterally projecting member 48 partway along its length. The lateral projection 48 is designed to fit within the aperture 12 so as to place the latching assembly 18 in the locked position 50, as shown in FIG. 3. The lateral projection 48 is locked in place within the aperture 12 by means of the step or notch 52 in the vertically leading edge 54 of the projection 48. The notch 52 is oriented at 90 degrees to the center line of the pivot point 47 of the lever 44 to the carriage 40. Thus, the projection 48 cannot be accidentally dislodged from the aperture 12 and hence the locked position 50.

Under normal conditions, the oscillations and vibrations experienced by the locking means 42 will cause the projection 48 to move horizontally and will want to move the projection 48 vertically out of the aperture 12. However, the notch 52 will abut the upper inside edge 56 of the aperture 12 thus stopping the vertical movement and preventing any premature disengagement of the latching assembly 18. The step or notch 52 also eliminates the need for an additional locking pin on the latching assembly 18, thereby simplifying the design and construction of the entire system 2. Therefore, without exerting direct upwards force on the locking lever 44, the projection 48 cannot be released from the locked position 50 and the support assembly 16 cannot be moved vertically.

Figure 5:
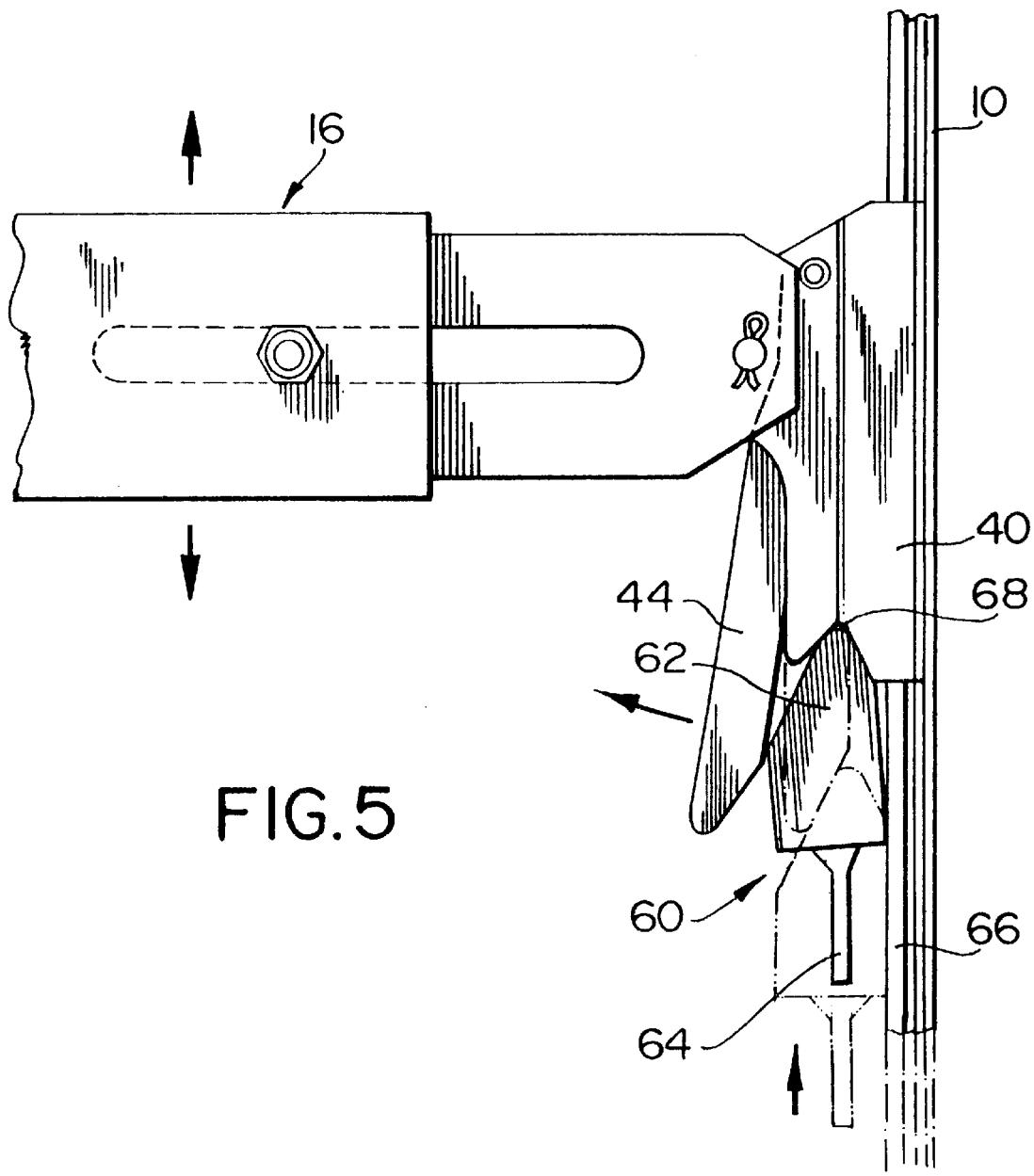
FIG. 5 is a side elevation, partially in section, of a preferred embodiment of the present invention.

With reference to FIG. 5, the system 2 is also provided with a decking tool 60 in the form of a wedge 62 located on the end of an elongated pole 64 or the like. The wedge 62 is shaped to slide along an outer face 66 of the track 10 and fit within a v-shaped groove 68 machined in the rear of the carriage 40. This allows the operator to release the locking means 42 from the locked position 50 by exerting a direct upward force on the lever 44. The latching assembly 18 is then in the unlocked position, shown at 70, in FIG. 4, and the support assembly 16 can be raised or lowered to another vertical position as desired. For convenience, when not in use, the support assembly 16 can be moved to the very top, or very bottom of the vessel 6.

With the system 2 of the present invention, the cargo 4 can be stored within the vessel 6 in such a way so as to maximize the space within the vessel 6, particularly vertically, by positioning the support assembly 16 at any one of a series of vertical positions between and relative to the tracks 10.

Thus, it is apparent that there has been provided in accordance with the invention an adjustable decking system that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The embodiments of the invention in which an exclusive property or privilege is claimed are defined as follows:

1. An adjustable and vertically lockable decking system for use in supporting freight in a cargo vessel wherein said vessel has opposing side walls, the system comprising:

at least one pair of elongated strips, each of said pair adapted to be mounted vertically on each of said opposing side walls wherein each of said strips comprises a plurality of vertically spaced apertures;

a horizontally oriented support assembly being horizontally adjustable in length so as to span a width of said vessel between said opposing side walls, said support assembly being pivotally connected at opposing ends thereof to a respective latching assembly, said latching assembly comprising a body member, a locking means constructed so as to be moveable between a locked position wherein said locking means mateably engages one of said apertures in a respective said strip so as to releasably lock said support assembly in one of a plurality of vertical positions relative to and between said elongated strips and an unlocked position wherein said support assembly is moveable to another of said vertical positions, and biasing means to urge said locking means into said aperture, said locking means comprising a lever having a longitudinal member pivotally connected to said body member and a laterally projecting member, said laterally projecting member comprising a generally v-shaped indentation in an upper edge of said laterally projected member, said indentation constructed so as to engage and retain an upper inside edge of said aperture when said laterally projecting member is mateably engaged with said aperture in said locked position, thereby preventing against upward or downward movement of said support assembly, wherein in use, said locking means may only be released from said locked position by means of force exerted directly upon said lever, from below said projection.

2. The system of claim 1 wherein said support assembly comprises an exterior hollow tubular member and a pair of interior members, each connected at one end in horizontal telescoping arrangement with said tubular member and pivotally connected at another end to said latching assembly.

3. The system of claim 1 further comprising wedge means for disengaging said locking means from said aperture so as to move said locking means to said unlocked position.

4. The system of claim 3 further comprising a groove in said body member constructed so as to accept said wedge means to facilitate disengagement of said locking means from said aperture.

5. In a vertically adjustable decking system for use in supporting freight in a cargo vessel wherein said vessel has opposing side walls and said system comprises at least one pair of vertically oriented elongated strips fastened to said opposing side walls and having a plurality of vertically spaced apertures therein, a locking apparatus moveable between a locked position for vertically securing a beam assembly in position between said pair of elongated strips and an unlocked position wherein said beam assembly may be moved to a different vertical position, said locking apparatus comprising a lever assembly having biasing means urging said lever assembly into said locked position wherein a projection mateably engages said apertures, said projection being stepped with a generally v-shaped notch constructed so as to positively retain an upper edge of one of said apertures when said projection mateably engages one of said apertures, so as to prevent premature release of said locking apparatus from said locked position.

* * * * *